Sept. 14, 1948. P. S. GAY 2,449,291
RECORDING APPARATUS VOLUME LEVEL INDICATOR
Filed Aug. 20, 1941
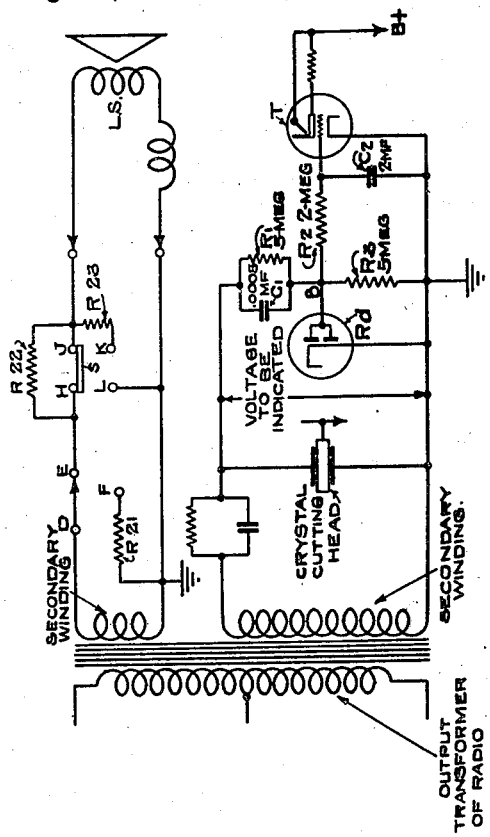
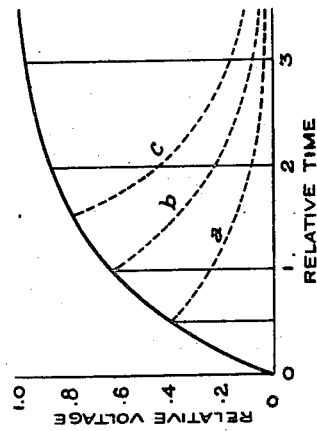
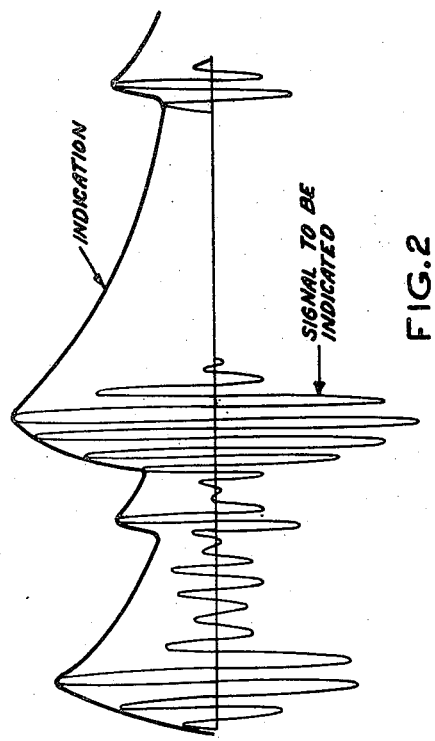
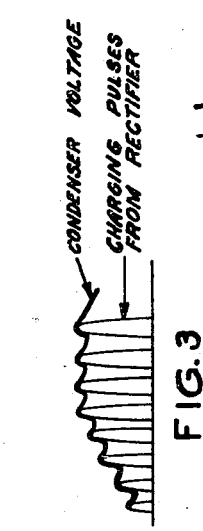
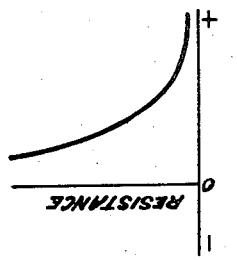
Inventor
Paul Stead Gay
by [signature]
attorney Patented Sept. 14, 1948

2,449,291

UNITED STATES PATENT OFFICE 2,449,291

RECORDING APPARATUS VOLUME LEVEL INDICATOR

Paul Stead Gay, Charlotte, Mich., assignor to Wilcox-Gay Corporation, Charlotte, Mich., a corporation of Michigan Original application February 26, 1940, Serial No. 320,823, now Patent No. 2,351,948, dated June 20, 1944. Divided and this application August 20, 1941, Serial No. 407,620

1 Claim. (Cl. 177—311)

This invention relates to recording mechanisms and more particularly to a phonograph recording mechanism of simplified and novel design particularly adapted for use by non-technical unskilled users. This is a division of Patent No. 2,351,948 issued June 20, 1944.

The primary object of the present invention is the provision of novel simplified volume level indication for sound recording apparatus.

The present specification is directed solely to the volume level indication aspect of my invention. The description of specific apparatus in connection with which it may be used has been cancelled from this specification since such description is present in Patent No. 2,351,948, the specification of which is incorporated by reference herein to substitute for the identical language cancelled herefrom.

Figure 1 is a plot of resistance against applied voltage for the rectifier of Figure 5.

Figure 2 is a plot of the general relation of fluctuation of the signal and of the indication in the circuit of Fig. 5.

Figure 3 is a graph of condenser voltage with respect to charging voltage.

Figure 4 is a graph of the fundamental behavior of condenser charging and discharging.

Figure 5 is a circuit for a volume level indicator for the recording apparatus herein described, showing also a loud speaker volume control circuit.

It is important in the operation of a sound recording machine while recording to maintain a predetermined fairly constant level of intensity so that the machine once adjusted to record voice, music or radio reception at a certain level of intensity should during that particular recording maintain the same level. That is, it is important for the operator to determine that the cutting head is receiving the same level of voltage during the recording function.

However, during the usual modulation cut on the record, the amplitude of peaks is constantly changing so that if any of the usual means of indication of volume level are used, there will be a constant shifting of the indicator. Thus, if a meter is used, the indicator or pointer thereof instead of remaining constantly at the average level will be constantly vibrating in accordance with the momentary peaks. If an electron ray indicator tube is used in the usual manner, the beam will constantly change its position resulting in a great deal of unnecessary confusion.

It is important, therefore, that in the design of this equipment, the indicator used should show average intensity over relatively long periods rather than momentary peaks. There has therefore been designed and built into the present equipment an electron ray indicator tube to indicate correct recording level, the said tube being, however, responsive not to momentary peaks but only to variations which may take place over a relatively long period as, for instance, of the order of two seconds.

A volume indicator has one main purpose; to make possible a ready adjustment of the volume control which will result in optimum recording level. If the recording level is too high, "ghosts," over-cutting or over-loading will result.

Over-cutting occurs when the cutting stylus is deflected laterally to the point where one groove impinges on the territory which normally belongs to its neighbor. When carried to an extreme, the grooves may join or cross. "Ghosts" occur when the stylus working in the softer materials actually forces material laterally rather than cutting only.

This material may be pushed toward the adjacent groove, so as to change the shape of the wall in which case the modulation which is recorded can be heard faintly in the adjacent groove. This phenomenon is principally noticed in speech recordings where silent periods are quite numerous and may coincide with a high volume of recording in the next or adjacent groove.

If the level is too low, the signal-to-noise ratio of the recording suffers, since any record has a certain amount of inherent noise.

The type of indication desired regardless of the form of indication is affected by a number of factors. Visual indicators are usually preferable. A device such as an oscillograph, for example, which indicates the instantaneous signal value may be unsatisfactory despite its accuracy. It is difficult for the eye to follow rapid variations which occur when recording sound. A relatively slow movement of the indicator is highly desirable. The damping and inertia effects of meter type indicators can be used to study the indication.

However, difficulty is encountered with mechanical resonance of the meter movement over swing due to inertia, the inability to indicate a high signal level of short duration, and other factors. A desirable type of movement of the indicator seems to include the following:

Motion in general slow enough to be readily followed by the eye.

Indication of the peak value of the signal during a time interval. In practice, this condition is modified to conform to the first condition, or accuracy of indication is sacrificed to obtain readability.

Electronic methods lend themselves admirably in effecting an optimum compromise. Once we have obtained an indication in the form of a voltage or current, it may in turn be utilized to operate any desirable form of indicator, usually visual; for instance, a meter or electron-ray tube.

In the following, response time is to be understood as the time required to indicate a signal. Recovery time is to be understood as the time required for the indication to cease after the signal is removed. In most types of indicators these two times are essentially equal. The compromise necessary in such a case involves a great sacrifice in the ability to indicate short duration peaks if the motion is made sufficiently slow to be easily followed with the eye.

A better compromise is obtained when the response time is made small relative to the recovery time. Under such conditions, peaks of short duration are indicated more accurately and during the major portion of the time, the indicator is moving slowly enough to be readily followed with the eye. I have in effect changed the ratio of response to recovery time while maintaining the same readability.

The general relation of fluctuations of the signal and of the indication desired are illustrated in Fig. 2. Improved accuracy and adjustment of the volume control is thus obtained with no greater concentration or effort on the part of the user.

In the volume indicating means herein described, advantage is taken of electronic means in obtaining desirable response and recovery times. Chiefly, the following principles are utilized and applied:

1. The charging or discharging of a condenser is a function of time depending upon the resistance in the circuit. A condenser reaches 63% of the applied potential in RC seconds, where the resistance is in series connection and R represents ohms and C represents farads.

Similarly, a condenser loses 63% of its charge in RC seconds with R as the discharge load. RC is known as the "time constant" of the resistance and capacity in combination.

2. A rectifier may be used to change the resistance connected in the circuit, being dependent upon the voltage drop across it as well as the polarity of the voltage.

A typical plot of resistance against applied voltage is shown in Fig. 1. Because of the possibility of a practically infinite resistance, a rectifier can function essentially as a switch for certain of the circuit elements. It is, however, to be understood that principles involved are not limited to any one particular type of rectifier.

The diagram of Fig. 5 illustrates the general type of indicator as used in the present application. The voltage source includes a certain amount of resistance which is comparatively negligible to the other circuit values.

$R_d$ represents the resistance offered by the rectifier which is diode in the case shown. On positive half-cycles (voltage drop across the rectifier itself) $R_d$ is a finite relatively low value, perhaps as low as 2000 ohms in the case of a diode. $R_1$ is very large compared with the conductive value of $R_d$ and $C_1$ charges at a rate proportional to $R_dC_1$.

If the signal is removed or reduced in value charging of $C_1$ stops. $R_d$ becomes substantially infinite and $C_1$ then discharges through $R_1$. The time constant on discharge then becomes $R_1C_1$. The two time constants can be made practically different by making $R_1$ much larger than the conductive value of $R_d$. The voltage drop across $C_1$ could be used as a control for an indicator as outlined previously. However, in this application there should not be much additional capacitive loading across the source of voltage nor resistive loading.

Owing to this factor, modifications in the magnitude of the indication with respect to the frequency of the signal are desirable as well as a certain amount of voltage division. The response should be different to different frequencies since the actual voltage required as frequency increases and decreases beyond a certain point is not the same.

$R_3$ is therefore added and the values of $R_1C_1$ and $R_3$ are proportioned so as to satisfy the multiple requirements of sensitivity, frequency characteristic, loading and time constant. The voltage appearing at point B is fed through the network $R_2$, $C_2$ to provide additional time constant effects. The voltage across $C_2$ is used as the control voltage for an electron ray tube indicator T. If a voltage is made to appear between points B and ground, $C_2$ charges through $R_2$ with a time constant $R_2C_2$. If the voltage between point B and ground is removed, $C_2$ discharges through $R_2$ plus the combination of $R_1$ and $R_3$ which is equal to $$\frac{R_1R_3}{R_1+R_3}$$

This difference in response and recovery time is rather closely approached in this specific application. The reactance of $C_1$ for most audio frequencies is of a low value compared to $R_1$, $R_2$, or $R_3$. As a result $C_1$ charges with the time constant close to $R_dC_1$ where $R_d$ is conductive.

As an example, assume the conductive value of $R_d$ to be 2000 ohms. Then $R_dC_1$ gives a time constant of .000001 second. When the rectifier becomes non-conductive, $C_1$ discharges into $R_1$, $R_3$ and $R_2$ thereby transferring part of its charge to $C_2$. The time constant for this discharge is approximately .0005 second. $C_2$ is 400 times as large as $C_1$. This means that $C_1$ must have its charge maintained from the signal for a proportionately longer time (compared to charging time of $C_1$) to effect the charging of $C_2$.

Considering point B referred to ground as the voltage source, $C_2$ charges with a time constant of .4 second and discharges with the time constant of .9 second the time constant ratio of 1 to 2¼. Since $C_1$ charges with a time constant of 1/500th of the discharge time constant, point B can for practical purposes be considered as the voltage source for $R_2C_2$ when the signal is present for an appreciable time compared to $R_2C_2$.

Some of the fundamental behavior of condenser charging and discharging is illustrated in Fig. 4. If unit voltage is applied to a condenser C through a resistance R the voltage appearing across C will vary with time in the manner of the solid line curve. If at some time, the applied voltage is removed and the condenser begins to discharge through the resistance R, the voltage across the condenser will vary with time in the manner of one of the dashed curves. In volume indicator applications, it is possible to obtain by a combination of those two elements an overall result wherein the time within which the electron ray tube eye opens is longer than the time required to close.

In the case of charging for unit time above: The charge reaches .63 of the applied voltage. Discharge follows curve b. In another unit of time the charge falls to .23. Theoretically the charge takes infinite time to reach O. The important point is that the condenser reaches 63% of the applied voltage in RC seconds, and is discharged to 37% of whatever charge existed in a like time.

The significant thing from the present point of view is that even though the two constants are equal, the apparent rate of charge is more rapid than the apparent rate of discharge. The negative slope of the dashed line curves cannot equal the positive slope of the solid line curve (at O time) unless it starts at unit relative voltage.

It is to be understood that when a condenser is charged by means of a rectifier from a source of A. C. as illustrated, then after each charging pulse, the condenser discharges in the manner of Fig. 3 until the next charging pulse occurs.

It is also apparent that time constants may be made cumulative. For example, an additional time constant could be included in the plate circuit of the electron-ray tube indicator T. Various components could be altered without changing the principles involved such as the use of full wave rectifiers, vacuum tube voltmeter type of indicators and other similar elements.

The principle of a control voltage having a different response time from the recovery time obviously has various other applications. The control voltage or current is to be strictly considered as a control for any desired function. Here, an indicator is controlled. Automatic volume control of audio level could be accomplished by similar means. Applications in industrial and commercial fields where timing is involved could be made to utilize the same principle.

The important feature of the principle is that the ratio between the two times can be controlled as well as the absolute value of either one. This principle has been approximated in some applications such as:

The generation of a "saw tooth" wave for sweep circuits in oscillographs. Time constants in automatic volume control circuits. Filtering or by-passing of radio frequencies at detector load impedances, etc.

In such applications, the operating conditions usually call for a large, usually the largest possible ratio between the two time constants rather than a specific ratio. Occasionally it is desired to make the time constants relatively large or small without particular regard to the ratio between them.

The novelty in the present idea consists in the control over the specific ratio as well as the absolute value in the two time constants. In this application, the means of changing the resistance in the circuit was stated to be a rectifier. Any device which effectively changes the resistance in the circuit for the charging operation as against the discharge operation will perform this function. An electrical rectifier is very well suited for this function although a relay for example might be used to effect a switching operation.

The use of this circuit in the present application produces a relatively quick response and slow recovery. This design is used so that the tube T as an indicator responds relatively rapidly to any voltage increase across the cutting head which it indicates and recovers at a slower rate.

Such relatively rapid response and slow recovery creates a safety factor of modulation so that a change in intensity is indicated for an appreciable or noticeable period; and of course the spreading of the response and recovery over an appreciable period smooths out the operation of the beam so that its variation is slow and leisurely instead of rapid and confused. This further facilitates use by a non-technical consumer.

Signals from a microphone may be amplified by the means already present in the radio, suitable switches being provided for that purpose, and then impressed on the cutting head. Simultaneously the voltage is utilized in the manner herein described to afford a visual indication and thus assist in preventing the difficulties and faults above described.

Now, when it is desired to listen to the program material being recorded at the same time that the record is being made, a means for separately adjusting the volume of reproduction is desirable. Where both the cutter and reproducer are operated from a common output stage, it is desirable to provide in these means a relatively constant load impedance so that changes in the volume of reproduction shall not affect the quality of recording.

In the present specific application, means for separately adjusting the volume of reproduction consists of a resistance which is insertable in the voice coil circuit of the loud speaker.

Referring to Fig. 5, R22 and R23 constitute these means, when contact is made between points H and J by the members, R22 is shorted and R23 is unconnected. This allows the speaker to have the full energization and when the contacts L and K are shorted, H and J are unshorted, resulting in R22 being in series and R23 being in shunt with the speaker voice coil. This results in attenuation of preferably 11.6 db which is normal room volume, approximately, for a small room.

It is obvious that stepped means could be employed, dividing off various values of resistance so that a stepped gradual change of audible volume would result.

It is important to note that the change of two resistors is necessary to maintain correct impedance balance so as to not affect the harmonic generation in the output stage and thereby its distortion to any marked degree. In the apparatus herein described, the mechanical means used for controlling the switching between H and J, and L and K is by means of a push button switch. Further, the push button is the same push button that controls the record radio function, having allowed a double stop on this push button so that when it is pushed into the first stop, loud room volume obtains, while, when pushed into the second stop, this volume is attenuated by the above mentioned 11.6 db. All this is done while maintaining an absolutely constant level of recording energy and not interfering therewith.

Should it be desired to disconnect the loud speaker coil L. S. completely during recording, then by appropriate push button means, the connection may be changed from D to E to a connection from D to F; the current then flowing through resistance R21 which maintains the correct impedance balance of the circuit.

The indicator herein described is useful in connection with and of extreme benefit in the operation of the device in that it indicates substantial changes in intensity of the source of sound used for recording so that the apparatus including the microphone and other electrical portions thereof may be adjusted for the change in intensity.

In each of the foregoing portions and in the entire constructions there has been described simply the preferred manner of utilizing the various principles herein set forth and the manner in which they have been commercially adapted to use. Obviously the various elements thereof may each take different forms, each within the spirit of the disclosure herein and accordingly I prefer to be bound not by the specific commercial disclosure herein but only by the appended claim.

I claim:

In sound recording apparatus having means for recording audible signals, said means including a source of voltage varying at an audible frequency having variable peak amplitude, a recording member responsive to said variations in said audio frequency voltage source; a first resistance condenser circuit and a diode connected across said recording member; said resistance condenser circuit having a time constant corresponding to a frequency lying within the audio frequency band; said resistance condenser circuit being connected to the anode of said diode; a second resistance condenser circuit connected across said diode; said second resistance condenser circuit having a long time constant compared to said first resistance condenser circuit and corresponding to a frequency lying below the audible frequency band and following only the average of the peaks of the audio frequency fluctuating voltages; and an electron ray tube having a grid and cathode; said condenser of said second resistance condenser circuit being connected across said cathode grid of said electron ray tube for operating said tube to indicate the average of the peaks of said variable audio frequency voltages.

PAUL STEAD GAY.

REFERENCES CITED

The following references are of record in the file of this patent:

UNITED STATES PATENTS

| Number | Name | Date |
| --- | --- | --- |
| 1,661,539 | Maxfield | Mar. 6, 1928 |
| 2,014,102 | Conklin | Sept. 10, 1935 |
| 2,100,769 | Siemens | Nov. 30, 1937 |
| 2,125,992 | Collings | Aug. 9, 1938 |
| 2,139,474 | Shepard, Jr. | Dec. 6, 1938 |
| 2,167,842 | Jackson | Aug. 1, 1939 |
| 2,175,690 | Happe, Jr. | Oct. 10, 1939 |
| 2,227,906 | Kellogg | Jan. 7, 1941 |
| 2,243,408 | Anderson et al. | May 27, 1941 |
| 2,272,849 | Perkins | Feb. 10, 1942 |
| 2,284,423 | Hansell | May 26, 1942 |
| 2,313,666 | Peterson | Mar. 9, 1943 |
| 2,323,762 | George | July 6, 1943 |